June 19, 1934.  A. M. HERBSMAN  1,963,406
METHOD OF TREATING PETROLEUM EMULSIONS
Filed May 25, 1931  2 Sheets-Sheet 1
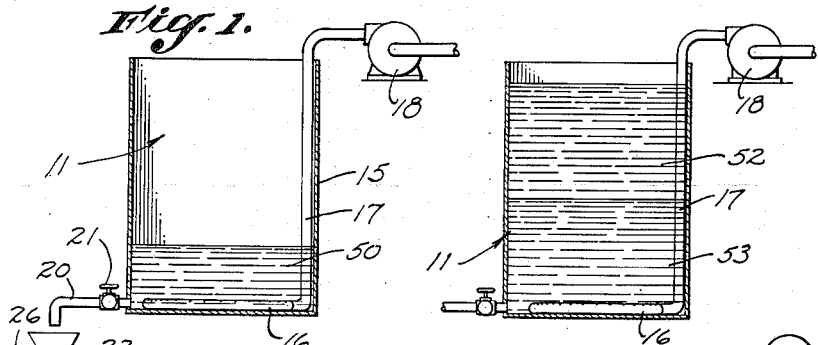
Fig. 1.  Fig. 2.
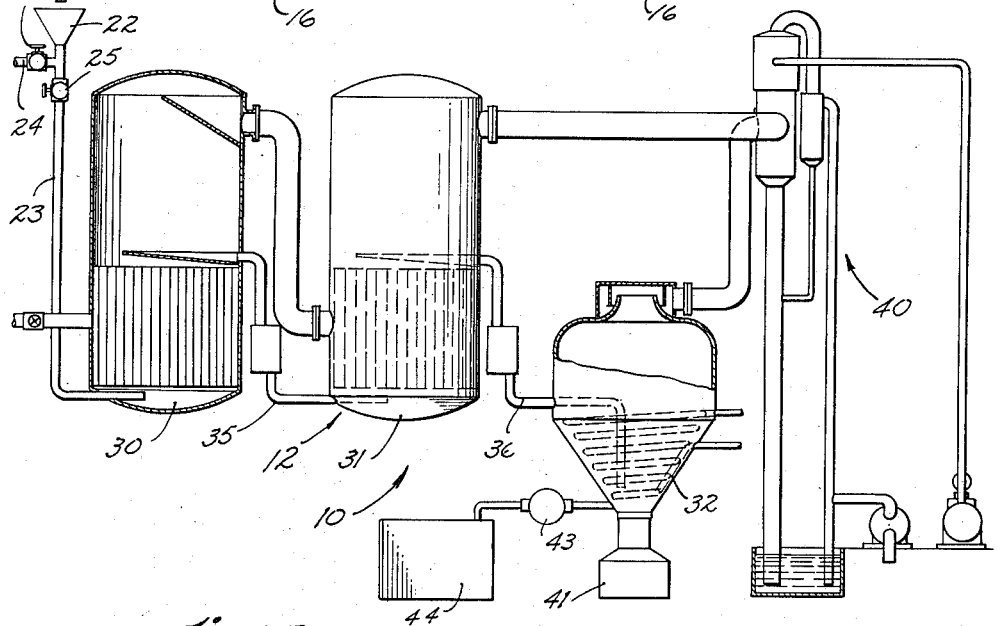
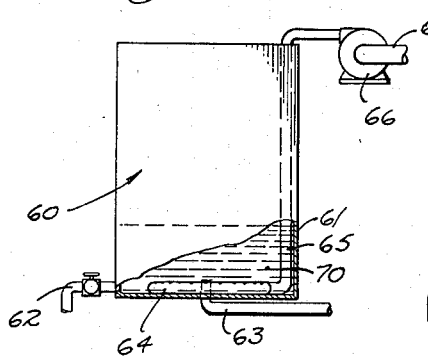
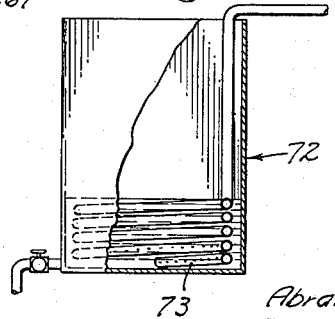
Fig. 3.  Fig. 4.
INVENTOR:
Abraham M. Herbsman
BY
ATTORNEY.

Patented June 19, 1934

1,963,406

UNITED STATES PATENT OFFICE 1,963,406

METHOD OF TREATING PETROLEUM EMULSIONS

Abraham M. Herbsman, Huntington Park, Calif., assignor to Industrial Patents, Ltd., Los Angeles, Calif., a corporation of California Application May 25, 1931, Serial No. 539,976

4 Claims. (Cl. 196—4)

My invention relates to improvements in the art of treating petroleum emulsions for the purpose of recovering the oil therefrom.

Much of the petroleum produced comes out of the wells in the form of an emulsion and it is necessary that this be treated to make the oil in the emulsion available for refining. The methods most commonly in commercial use for this purpose at present include electrical dehydration and chemical treatment, which are used either singly or in combination to bring about agglomeration of the water particles in the emulsion so as to cause stratification of the oil and the water when the emulsion is allowed to rest. Ordinarily the chemical process is considerably slower than electrical dehydration, although when heat is used in conjunction with chemicals, the time required for the treatment is generally substantially decreased.

The present invention relates to the manner of applying any chemical in the treatment of petroleum emulsions, and objects of the invention are, broadly: to provide such a method which will be economical in the use of the chemical; which will permit the recovery of the chemical used to treat the emulsion; which will decrease the time required in accomplishing a chemical treatment of petroleum emulsion; which will permit a more thorough treatment to be accomplished by a given chemical; which will permit the recovery of valuable salts occurring in the connate water which is mixed with the oil in the well to form the emulsion; and to provide a method of treating petroleum emulsions chemically which will permit the recovery of lighter oil fractions which are usually evaporated and lost in the treatment of the oil.

The manner of accomplishing the foregoing objects, as well as further objects and advantages, will be made manifest in the following description, together with the accompanying drawings, in which:

Fig. 1 is a diagrammatic view illustrating a preferred form of apparatus for carrying out the method of my invention.

Fig. 2 is a view of the treating tank shown in Fig. 1 in a different stage of the operation of the method of the invention.

Figs. 3, 4 and 5 are diagrammatic views showing modified forms of treating tanks adapted to be used in the apparatus in Fig. 1.

Figure 6:
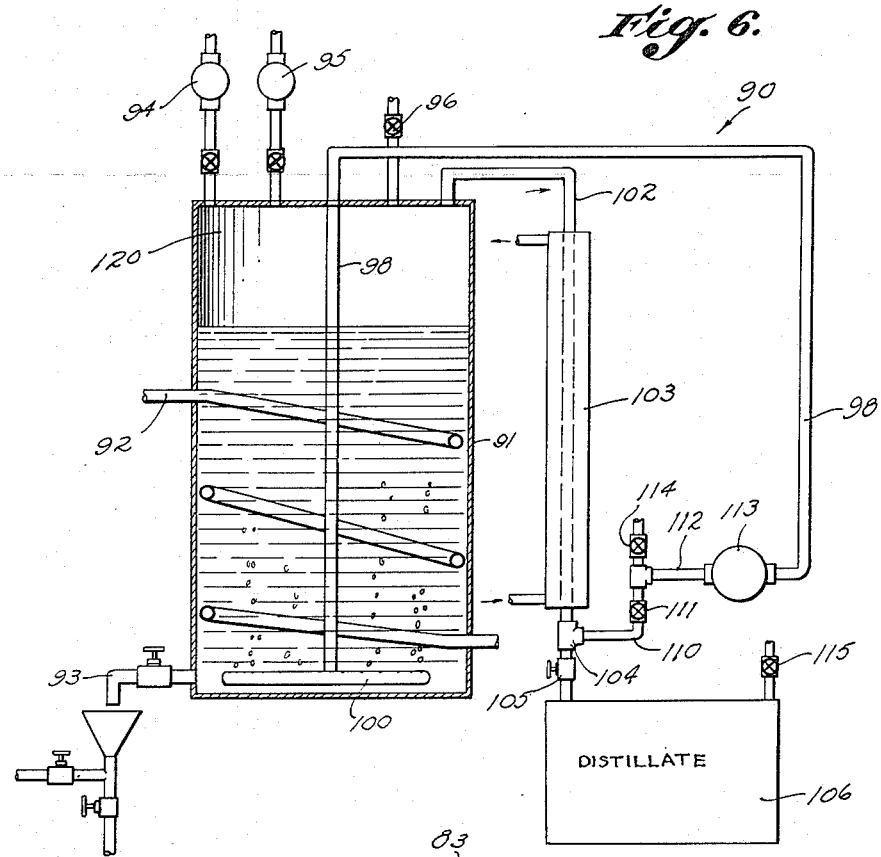
Fig. 6 is a diagrammatic view illustrating a treating tank which may be utilized in connection with the apparatus of Fig. 1 for carrying out a modified form of the method of my invention.

Referring specifically to the drawings, Fig. 1 shows an apparatus 10 including a treating tank 11 and a triple effect evaporating system 12. The preferred form of treating tank 11 includes a shell 15 having a petroleum emulsion manifold 16 disposed in the bottom thereof. Connected to the manifold 16 is a pipe 17 having a pump 18 which is connected to a supply of petroleum emulsion so that when the pump is set in operation this emulsion is injected with great force from the manifold 16 into the treating tank 11.

The shell 15 has a drain pipe 20 having a valve 21, this pipe opening over a funnel 22 which connects to two lines 23 and 24 having valves 25 and 26.

The triple effect evaporating system 12 includes evaporator units 30 and 31 and a concentrator unit 32. The pipe 23 connects with the unit 30 and liquid supplied to this unit through this pipe is adapted to overflow through a pipe 35 into the second unit 31 from which fluid is adapted to overflow through a pipe 36 into the concentrator 32.

The concentrator 32 is provided with a pump and condenser system 40 for maintaining a vacuum in the concentrator 32. The concentrator is also provided with a crystal separator 41.

As the evaporating system 12 is a standard piece of apparatus and operates in the manner well known in the art, no detailed description of this is deemed necessary. The effect of the evaporating system is to reduce the content of water in any solution delivered thereto and permit the crystallization and removal of salts from the solution in the concentrator 32. At the time of starting the method of my invention, the system 12 is heated up and prepared for receiving a solution so that it can operate upon it in the manner indicated.

The method of my invention is preferably carried out by the use of a water soluble emulsion treating chemical which is practically insoluble in oil such as a sulphonated vegetable oil neutralized to render it water soluble. In performing the method with the apparatus 10 a concentrated body 50 of this chemical is placed in the treating tank 11, the valves 21 and 26 being closed and the valve 25 being open. The pump 18 being connected up to draw emulsion from a storage tank or receive this directly from a well, injects this emulsion into the treating tank 11 through the manifold 16 so that the emulsion comes immediately into intimate contact with the chemical 50. When a sufficient quantity of emulsion has thus been injected into the treating tank 11 to fill it up to the level shown in Fig. 2, the injection of emulsion is stopped and the mixture of emulsion and chemical is allowed to stand. During the injection of the emulsion into the chemical a relatively violent agitation of the mixture results, which causes a very rapid treatment of the emulsion to take place with the result that the water particles in the dispersed phase in the emulsion are coagulated in a relatively short space of time. In the presence of a concentrated water soluble chemical suitable for treating this particular emulsion these coagulated particles of emulsion water immediately form an admixture with the chemical. Accordingly, when the treatment is stopped and the mixture allowed to stand, as shown in Fig. 2, a stratification takes place in which a body of oil 52 rises to the top of the tank 11 and the body of admixture 53 between the emulsion water and the treating chemical settles to the bottom of the tank. In most oil fields it has been found that water contained in petroleum emulsions formed in the production of the petroleum contains salts, a number of which are very valuable as industrial and medicinal compounds, such as iodides.

In continuing the method of my invention, therefore, the valve 21 is opened and the body of admixture 53 is drained from the tank 11 and is discharged into the funnel 22 from which it passes down the pipe 23 into the first unit 30 of the evaporating system 12. As soon as oil commences to show in the funnel 22, the valve 25 is turned off, the valve 26 turned on and the body of oil 52 is then drained from the tank 11 along a pipe 24 to a suitable place of storage (not shown). The valve 21 is now closed and the treating steps of the method which take place in the tank 11 are repeated in the manner above described.

The proportion of water to oil in the various types of petroleum emulsions differs considerably. In Fig. 2 I have arbitrarily shown a certain volume of admixture 53 which assumes that a quantity of water has been removed from the emulsion injected into the chemical 50, this volume of water representing the difference in volumes between the quantity of chemical 50 shown in Fig. 1 and the quantity of admixture 53 shown in Fig. 2. As above stated, the water thus added contains valuable salts. It is the purpose of the evaporating system 12 to evaporate water from the admixture 53 until this admixture becomes concentrated to a point where the salts formerly contained in the emulsion water will crystallize and settle into the lower part of the concentrator 32 from which they are discharged into the crystal separator 41 in which they are removed from the admixture. There now remains in the concentrator 32 only a more or less concentrated solution of the original chemical 50 which is pumped from the concentrator by the discharge pump 43 and discharged into the chemical storage tank 44 to be reused in subsequent treatments of emulsion batches in the treating tank 11.

It is thus seen that the method of my invention is based upon use of a treating chemical which will not separate out from the solution in the evaporating system 12 at all or at least until after the connate water salts, which it is an important object of my invention to recover, have crystallized out of this solution. In carrying out my method, therefore, the choice of a treating agent is made with this step of the method in mind. In fact, the preferred manner of performing this method is to use a noncrystalline treating agent such as a sulphonated oil which is water soluble but which does not crystallize out of solution.

By my method of using concentrated chemical and injecting the emulsion into the chemical, a much quicker separation of the oil and water in the emulsion is effected than has ever previously been possible in the chemical treatment of petroleum emulsions. Furthermore, by using a water soluble chemical practically all of this chemical is reclaimed so that it may be used over and over again without loss of strength or decrease in the efficiency of the treatment. In this process the cost of reclaiming the chemical is more than paid for by the valuable salts recovered in the crystal separator 41, while the increase in speed of the demulsifying part of the process and the increase in thoroughness of the dehydration of the emulsion are net gains.

It is to be understood that the apparatus 10 is diagrammatically shown in Fig. 1 and that many other forms of apparatus may be practically used for the carrying out of the novel method of my invention. For instance, the evaporating system 12 may be on the same level or a higher level than the treating tank 11 in which case pumps would be provided for transferring chemical fluids which in this apparatus are caused to flow by gravity from one element of the apparatus to another.

In Fig. 3 I show a modified form of treating tank 60 which includes a shell 61 having a valved drain pipe 62 and an emulsion inlet pipe 63 which opens centrally into the tank 60. Disposed about the emulsion inlet pipe 63 is a gas discharge manifold 64 which connects to a pipe 65 having a blower 66. Either gas or air may be supplied to the blower 66 as desired, through a pipe 67 connected to its inlet end.

The tank 60 is adapted to be put in the place of the tank 11 in the apparatus 10 and performs in practically exactly the same manner as the tank 11 excepting that the emulsion instead of being injected into a body of chemical 70 in the shell 61 under high pressure, is admitted under low pressure to the pipe 63 and the intimate mixture between the emulsion and the chemical is brought about by agitation of the mixture by gas ejected from various openings in the manifold 64. An intimate mixture of the emulsion and chemical which is necessary for the carrying out of my process, is thus satisfactorily brought about.

In Fig. 4 I have shown another modified form of treating tank 72 which is also adapted to be substituted for the tank 11 in the apparatus 10. The tank 72 is provided with a coiled oil introducing manifold 73 having openings disposed toward the center of the tank so that a complete mixture of the emulsion with the chemical in this tank may be quickly effected.

Figure 5:
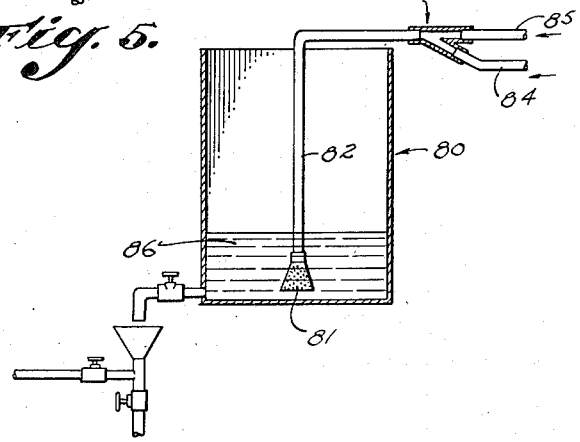

Fig. 5 shows a modified form of treating tank 80 which may also be substituted for the treating tank 11 in the apparatus 10. This tank has a nozzle 81 connected to a pipe 82 having a liquid and gas mixing nozzle 83 which is adapted to be supplied with emulsion through a pipe 84 and with air or some other gas through a pipe 85. The manner in which the treating tank 80 operates is to connect the pipe 84 with a pump or other means for discharging a stream of emulsion thereinto and the pipe 85 with a natural gas main or blower for supplying gas or air under pressure thereto. The gas and emulsion mix in the nozzle 83 and passing downwardly through the pipe 82 are discharged from the nozzle 81 into a body of concentrated chemical 86 disposed in the tank 80, as shown in Fig. 5. A discharge of emulsion into the chemical in this manner in the form of a gasified spray effects a complete and immediate mixture between the emulsion and the chemical with correspondingly quick dehydrating action on the emulsion. The stratification between the oil separated from the emulsion and the admixture of chemical and water separated from the emulsion is effected in the same manner as described in connection with the operation of the apparatus 10.

In Fig. 6 I have illustrated yet another modified form of apparatus 90 which may also be substituted for the treating tank 11 in the apparatus 10. The apparatus 90 includes a closed shell 91 provided with a steam-heating coil 92, a drain pipe 93, a two-inch vacuum valve 94, and a four-pound blowoff valve 95. Also connecting with the tank 91 is a pipe 96 for the introduction of chemical and emulsion into the tank. Extending downwardly into the tank 91 is a pipe 98 which is provided at its lower end with a gas and vapor discharging nozzle 100. Connecting with the extreme upper end of the tank 91 is a pipe 102 which extends downwardly through a jacket 103 (the purpose of which will be made evident hereinafter), and has a T-fitting 104, a valve 105 and opens at its lower end into a distillate tank 106. Connecting with the T 104 is a pipe 110 having a valve 111 which connects to an intake pipe 112 of a pump 113, the discharge end of which connects to the pipe 98. The intake pipe 112 also has a valve 114 and the distillate tank 106 has a valve 115 which leads to the atmosphere.

The operation of the apparatus 90 begins with the introduction of a quantity of concentrated chemical through the pipe 96 into the tank 91 and thereafter an introduction of a quantity of emulsion into the tank in this same manner. The valve of the drain pipe 93 is closed, the valves 105 and 114 are closed, the valve 111 is open, so that the tank 91 is substantially a closed container excepting that where a vacuum of two inches occurs in this tank the valve 94 will allow the inlet of the air from the atmosphere to relieve this vacuum, whereas if a pressure greater than four pounds per square inch is developed in the tank 91, this is allowed to escape through the blowoff valve 95.

The mixture of emulsion and chemical is not allowed to extend clear to the top of the tank 91 but leaves a gas and vapor chamber 120 at the top thereof. A pump 113 is now set in motion so as to draw the gas and vapor from the chamber 120 and discharges this through the pipe 98 and the nozzle 100 into the lower end of the tank 91. The agitation resulting from this discharge of gas and vapor into the lower end of the tank causes a rapid and thorough mixture of the chemical and emulsion in the tank so that the emulsion is subjected to a relatively strong treatment. As this treatment proceeds, it may be desirable to heat the mixture in the tank 91 by the discharge passing steam through the coil 92. Where heat is thus used, the time required for the treatment is diminished somewhat.

One of the advantages of using the apparatus 90 is that in the usual methods of treatment agitation and heating of emulsion results in the giving off of lighter fractions of the oil and of these being lost in the atmosphere. In carrying out my method in the apparatus 90 any vapors driven off the emulsion are retained in the circuit of the pump 113 and the pressure set up in the tank 91 tends to decrease the amount of evaporation which would otherwise take place. After sufficient treatment of the emulsion in this manner, cold water is passed through the jacket 103, the valve 105 is turned on and the circulation of vapors continued until the condensing of vapors in the jacketed pipe 102 results in a vacuum being formed in the chamber 120 so as to draw air from the atmosphere into the vacuum valve 94. When this occurs, the pump 113 is stopped, the valve 114 is open, and the mixture in the tank 91 is allowed to stand for a sufficient length of time to stratify the oil which has been released from the emulsion, and the admixture of chemical and emulsion water. If desired, the elevated temperature of the liquid in the tank 91 may be maintained during the period of stratification by the steam coil 92. It is sometimes desirable that this temperature be maintained, as in certain cases this results in decreasing the time required for stratification.

After stratification of the mixture in the tank 91, the admixture of emulsion water and chemical is drawn off separately from the oil and treated in the apparatus 10 in the manner already described.

It is to be noted that in the carrying out of my method by the various forms of apparatus described hereinabove, the emulsion to be treated is always discharged into a body of treating chemical and rapidly agitated in mixture therewith either by the violence with which the emulsion is introduced or by the application of other means for securing a complete mixture of the chemical and emulsion.

As previously stated, my method has many advantages, the most important of which result from the rapidity with which an emulsion may be dehydrated by this method, the relatively complete dehydration which results from the treatment, and the economy in the use of the chemical owing to the fact that this may be reclaimed by my method and used repeatedly in treating successive batches of emulsion. Recovery of the chemical as in my method makes possible the use of a concentrated solution or excess of chemical for speeding up the treatment, whereas this formerly never could have been done owing to the prohibitive cost of the concentrated chemical. Although not strictly limited to the use of a water soluble chemical, this type of chemical may be used with particular advantage in the method of my invention owing to the fact that waste of the chemical through solution in the oil is substantially prevented.

What I claim is:

1. A combined method for recovering oil and mineral salts from natural petroleum emulsions, which comprises thoroughly admixing the petroleum emulsion with a highly concentrated solution of an emulsion breaking reagent substantially more soluble in water than the mineral salts in the aqueous phase of said emulsion, allowing the admixture to stand and stratify, withdrawing the oil layer and delivering same to storage, separately withdrawing the water layer containing the dissolved reagent and mineral salts, concentrating the soltuion to the crystallization point of said salts, recovering said salts in crystal form and returning the residual solution of emulsion breaking reagent to the process for further emulsion breaking.

2. A combined method for recovering oil and mineral salts from natural petroleum emulsions, which comprises injecting the petroleum emulsion into a water soluble and highly concentrated emulsion breaking reagent that is more soluble in water than the mineral salts in the aqueous phase of said emulsion, stratifying the mixture thus produced, separately withdrawing the oil layer and the water layer containing the dissolved reagent and mineral salts, concentrating the solution to the crystallization point of the salts, recovering said salts in crystal form, and returning the residual solution of emulsion breaking reagent to the process for further emulsion breaking.

3. A combined method for recovering oil and mineral salts from natural petroleum emulsions, which comprises thoroughly admixing the petroleum emulsion with a water soluble liquid emulsion breaking reagent that is more soluble in water than the mineral salts in the aqueous phase of said emulsion, allowing the admixture to stand and stratify, separately withdrawing the oil layer and the water layer containing the dissolved reagent and mineral salts, concentrating the solution to the crystallization point of said salts, recovering said salts in crystal form, and returning the residual emulsion breaking reagent to the process for further emulsion breaking.

4. A combined method for recovering oil and mineral salts from natural petroleum emulsions, which comprises thoroughly admixing the petroleum emulsion with a highly concentrated solution of an emulsion breaking reagent substantially more soluble in water than the mineral salts in the aqueous phase of said emulsion and which has a crystallization coefficient differing from that of said salts, allowing the admixture to stand and stratify, separately withdrawing the oil layer and the water layer containing the dissolved reagent and mineral salts, concentrating the solution to the crystallization point of said salts, recovering said salts in crystal form, and returning the residual solution of emulsion breaking reagent to the process for further emulsion breaking.

ABRAHAM M. HERBSMAN.